(12) United States Patent
Iwakawa

(10) Patent No.: US 6,330,489 B1
(45) Date of Patent: Dec. 11, 2001

(54) MAGNETIC TAPE APPARATUS

(75) Inventor: Hirofumi Iwakawa, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/422,329

(22) Filed: Oct. 21, 1999

(30) Foreign Application Priority Data

Oct. 21, 1998 (JP) .................................................. 10-299377

(51) Int. Cl.⁷ ...................................................... G06F 7/00
(52) U.S. Cl. .................... 700/218; 700/214; 700/259; 414/273; 414/274
(58) Field of Search .................... 700/213, 214, 700/215, 218, 245, 253, 259; 901/1, 9, 47; 414/270, 273, 274, 266

(56) References Cited

U.S. PATENT DOCUMENTS

| 5,416,914 | * | 5/1995 | Korngiebel et al. | 395/425 |
| 5,418,732 | * | 5/1995 | McFadin | 364/478 |
| 5,426,581 | * | 6/1995 | Kishi et al. | 364/167.01 |
| 5,450,385 | | 9/1995 | Ellis et al. | |
| 5,946,160 | * | 8/1999 | Ohashi | 360/92 |
| 5,959,866 | * | 9/1999 | Hanaoka et al. | 364/478.02 |
| 6,005,734 | * | 12/1999 | Simada et al. | 360/69 |
| 6,192,294 | * | 2/2001 | Chiba | 700/214 |
| 6,213,705 | * | 4/2001 | Wilson | 414/274 |

FOREIGN PATENT DOCUMENTS

| 57-152653 | 3/1956 | (JP) . |
| 58-157196 | 9/1983 | (JP) . |
| 61-211890 | 9/1986 | (JP) . |
| 62-84467 | 4/1987 | (JP) . |
| 64-46808 | 2/1989 | (JP) . |
| 4-20403 | 1/1992 | (JP) . |
| 4-319564 | 11/1992 | (JP) . |
| 5-261684 | 10/1993 | (JP) . |
| 7-101509 | 4/1995 | (JP) . |
| 2662189 | 6/1997 | (JP) . |
| 10-11854 | 1/1998 | (JP) . |
| 10-302356 | 11/1998 | (JP) . |

* cited by examiner

*Primary Examiner*—Christopher P. Ellis
*Assistant Examiner*—Khoi H. Tran
(74) *Attorney, Agent, or Firm*—Young & Thompson

(57) ABSTRACT

A magnetic tape apparatus of the present invention includes an accessor mechanism movable in a Y direction in response to a command received from a host and a hand mechanism mounted on the accessor mechanism and movable in the X direction. Address charts are provided on the individual cell for accommodating a cartridge storing a recording medium therein. The address charts serve as indices indicative of positions of the cell in the X direction and the Y direction. Reduction optics is mounted on the hand mechanism and includes a light source, a monodimensional CCD (Charge Coupled Device), and a lens. The apparatus is miniature, low cost, high performance and simple and capable of accurately sensing a position with reliability.

11 Claims, 13 Drawing Sheets

MAGNETIC TAPE APPARATUS

BACKGROUND OF THE INVENTION

The present invention relates to a magnetic tape apparatus and more particularly to an integrated magnetic tape apparatus including a hand mechanism for taking in and out a cartridge storing a magnetic tape therein and an accessor mechanism for causing the hand mechanism to freely move to a designated position.

Today, a large capacity, integrated magnetic tape apparatus including a hand mechanism and a accessor mechanism is extensively used. Japanese Patent Laid-Open Publication No. 4-20403, for example, discloses a positioning method for positioning the hand mechanisms by use of a bidimensional relative position sensor. The relative position sensor reads a linear scale representative of a position index so as to store the absolute position of the hand mechanism. Another bidimensional relative position sensor is mounted on the hand mechanism for correcting the position of the hand mechanism.

Japanese Patent Laid-Open Publication No. 10-11854 teaches a positioning method using flags. Specifically, flags representative of the addresses of cartridges are arranged in one-to-one correspondence to cells in the lengthwise direction of a magnetic tape apparatus. A board mounted on an accessor mechanism and including a sensor senses the flags for positioning a hand mechanism.

Further, Japanese Patent Laid-Open Publication No. 10-302356 proposes a positioning method using a monodimensional position sensor including reduction optics, a light source and a monodimensional CCD (Charge Coupled Device) in place of the above sensors. The position sensor senses a geometrically patterned address plate.

The problem with the above conventional positioning schemes is that they need sophisticated, bulky arrangements to practice and thereby increases the cost. Moreover, accurate positioning is difficult to achieve with the conventional schemes.

Technologies relating to the present invention are also disclosed in, e.g., Japanese Patent Laid-Open Publication Nos. 4-319564, 5-261684, 7-78401 and 7-101509.

SUMMARY OF THE INVENTION

It is therefore an object of the present invention to provide a magnetic tape apparatus which is small size, low cost, high performance and simple and capable of effecting accurate position detection with reliability.

A magnetic tape apparatus of the present invention includes an accessor mechanism movable in a Y direction in response to a command received from a host and a hand mechanism mounted on the accessor mechanism and movable in the X direction. Address charts are provided on the individual cell for accommodating a cartridge storing a recording medium therein. The address charts serve as indices indicative of positions of the cell in the X direction and the Y direction. Reduction optics is mounted on the hand mechanism and includes a light source, a monodimensional CCD, and a lens.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 2:
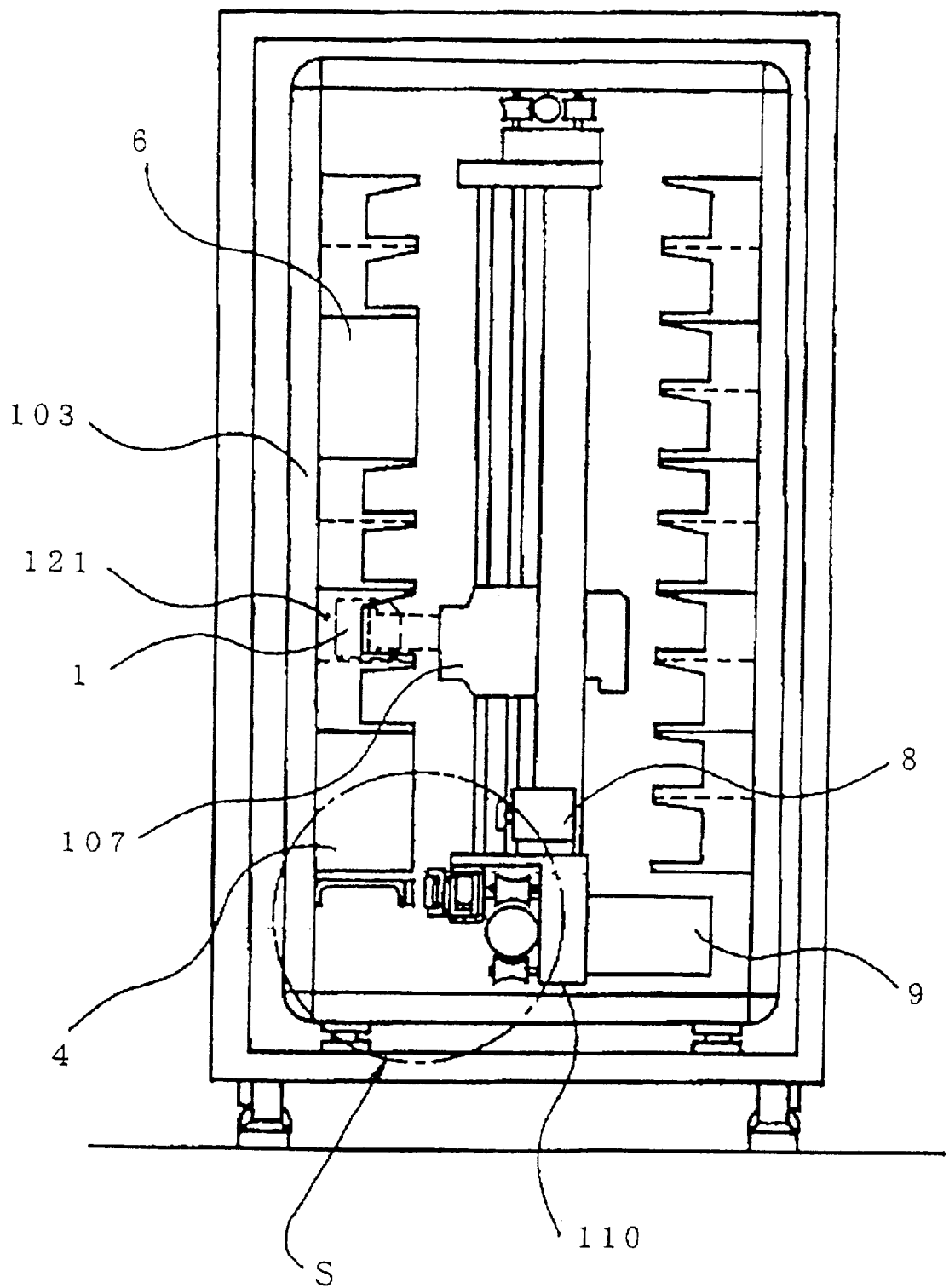
FIG. 2 is a side elevation of the apparatus shown in FIG. 1.
Figure 3:
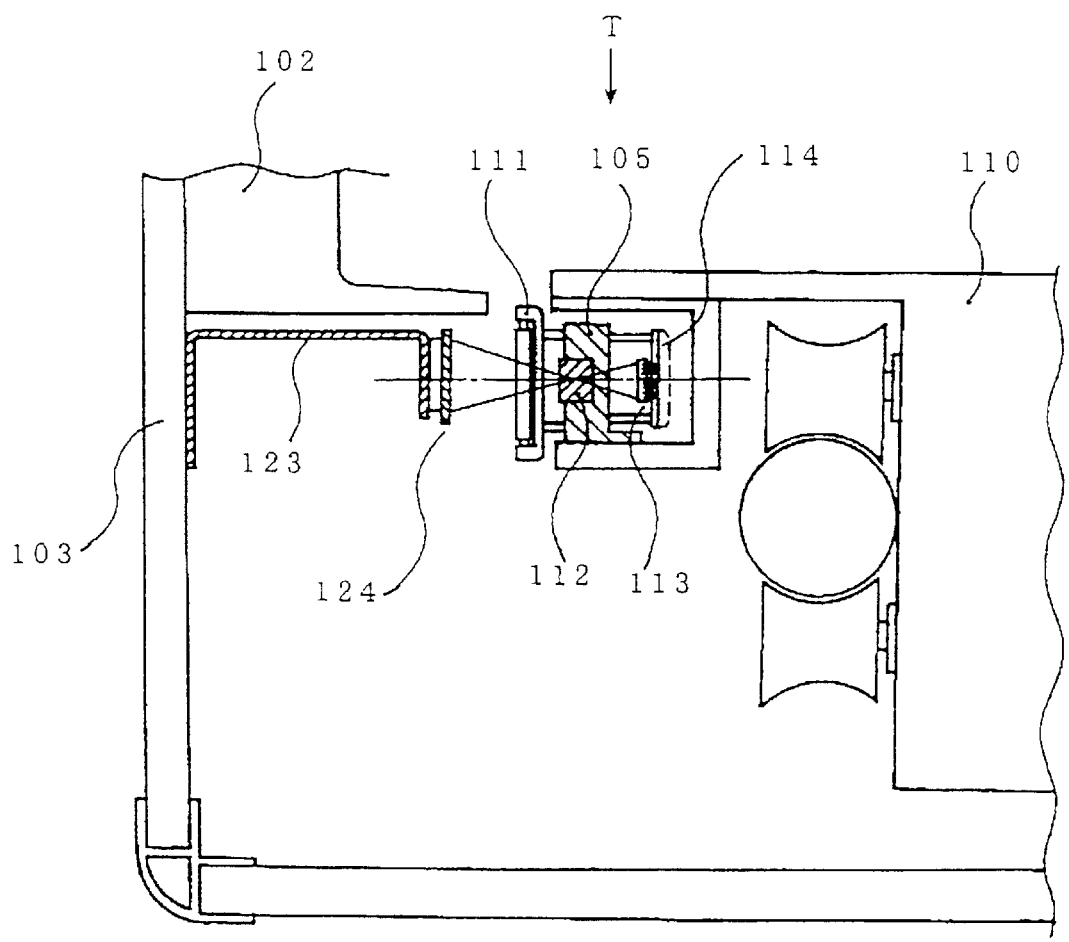
FIG. 3 is a fragmentary enlarged view of a portion indicated by a circle S in FIG. 2.
Figure 4:
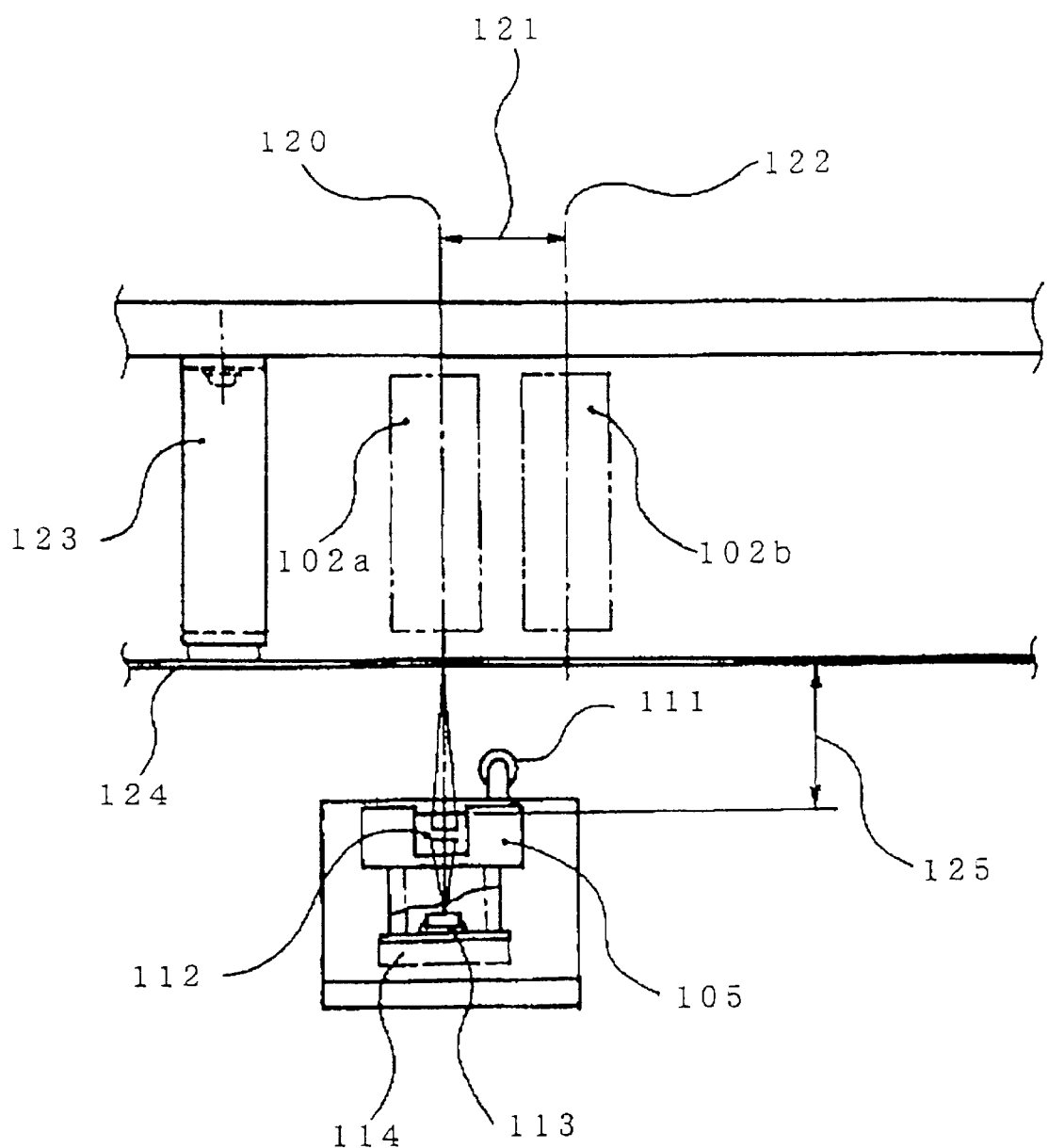
FIG. 4 is a view as seen in a direction indicated by an arrow T in FIG. 3.

To better understand the present invention, brief reference will be made to a positioning method for a magnetic tape apparatus disclosed in Japanese Patent Laid-Open Publication No. 10-302356 mentioned earlier. As shown in FIGS. 1–4, the magnetic tape apparatus includes cells 102 (102a and 102b in FIG. 4) storing cartridges 1. An accessor mechanism 110 is movable in an X direction in response to a command received from a host not shown. A drive unit 4 writes or reads data in or out of designated one of the cartridges 1. A hand mechanism 107 is mounted on the accessor mechanism 110 in order to take out designated one of the cartridges 1 from the associated cell 102 and convey it to the drive unit 4 or to convey the cartridge 1 from the latter to the former. An X motor 9 drives the accessor mechanism 107 in the X direction while a Y motor 8 drives the hand mechanism 107 in the Y direction. An opening 6 allows the cartridges 1 to be loaded and unloaded therethrough. Flag plates 124 are provided with address charts serving as position indices and arranged at the pitch of the cells 102. The accessor mechanism 114 is loaded with a CCD 113, a CCD board 114 for digitizing the output of the CCD 113, a light source 111 for emitting light toward the flag plates 124, and a lens 112 held by a lens holder 105. As shown in FIG. 4, the cells 102a and 102b have center axes 120 and 122, respectively. The center axes 120 and 122 are spaced by a distance 121 representative of the pitch of the cells. The lens 112 and each flag plate 124 are spaced by a distance 125.

Figure 1:
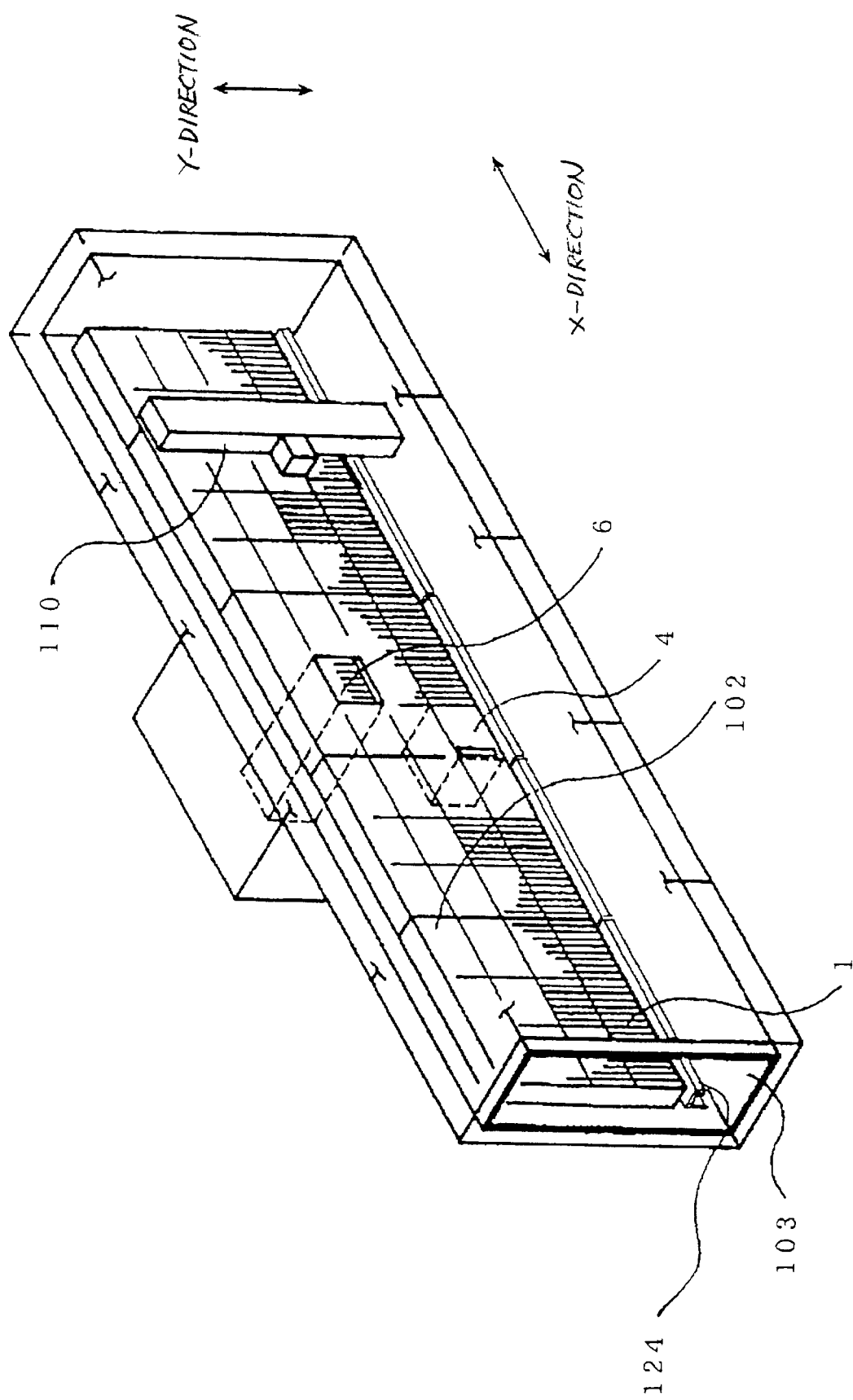
FIG. 1 is a perspective view showing a conventional magnetic tape apparatus.

As shown in FIG. 1, the flag plates 124 must extend over the entire length of the magnetic tape apparatus in the X direction. This brings about a problem that to accommodate a greater number of cartridges 1 in the apparatus, a greater number of flag plates 124 must be connected in the X direction. As a result, an extra period of time is required for guaranteeing the accurate connection of the flag plates 124.

The cells 102 each are aligned with a particular flag plate 124 in the X direction. In addition, the cells 102 are stacked one above the other in the Y direction. As shown in FIG. 2, the cells 102 positioned one above the other must be accurately aligned with each other in the Y direction. It is therefore necessary to provide the individual cell 102 with high accuracy both in contour and in position, and to form mounting holes in a honeycomb plate 103 with high accuracy. Such accuracy required of the apparatus obstructs simplification and cost reduction.

Furthermore, each flag plate 124 extends over the associated case and occupies a portion indicated by a circle S in FIG. 2. That is, the portion C should be exclusively allocated to the flag plate 124 and a flag bracket 123, limiting the layout of the apparatus.

Figure 5:
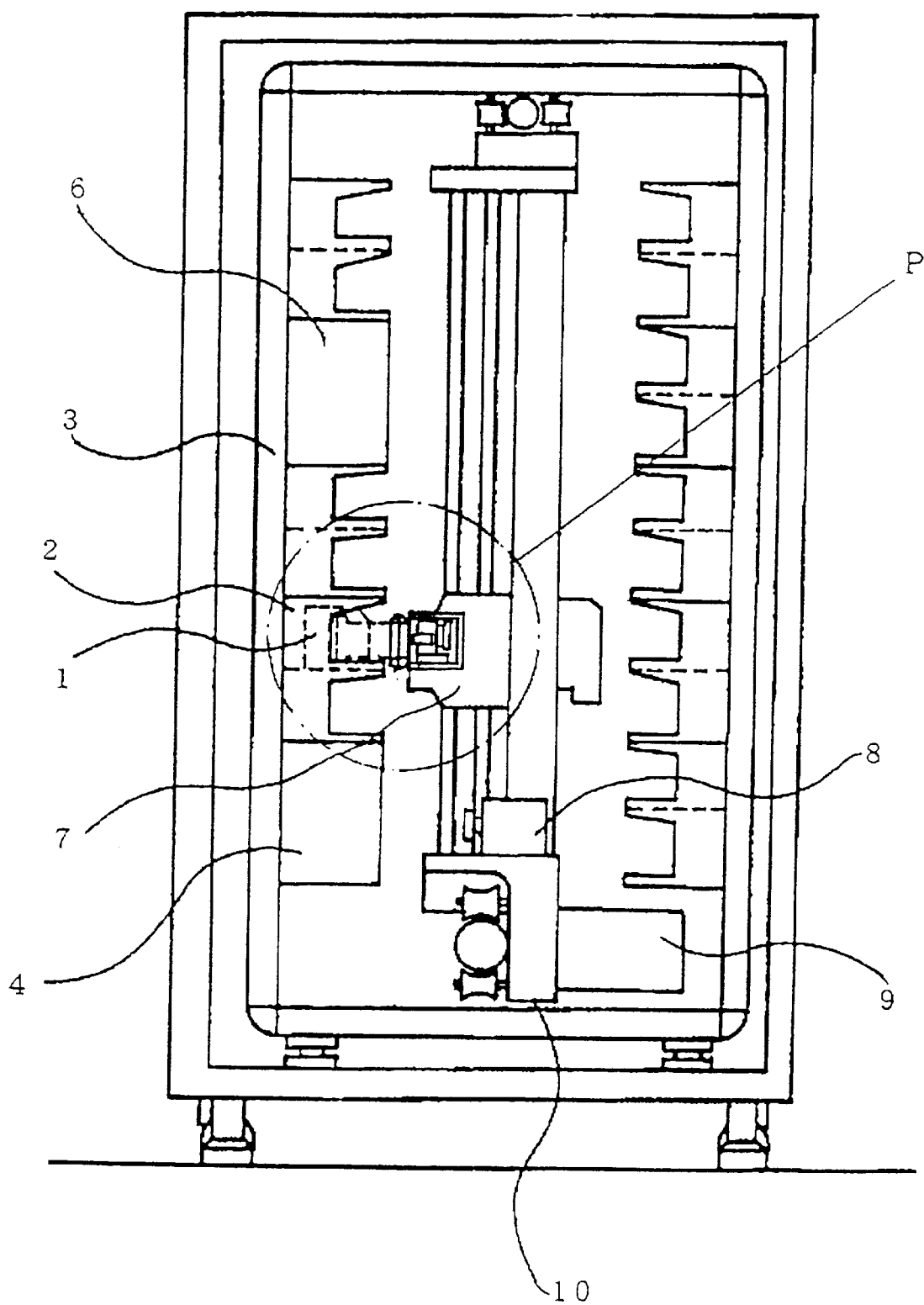
FIG. 5 is a side elevation showing a magnetic tape apparatus embodying the present invention.

Referring to FIG. 5–8, a magnetic tape apparatus embodying the present invention is shown. As shown, the apparatus includes cells 2 accommodating cells 1 each storing a magnetic tape or recording medium therein. A drive unit 4 selectively writes or reads data in or out of the recording medium brought thereto. An opening 6 is used to load or unload the cartridges 1. A hand mechanism 7 is mounted on an accessor mechanism 10 for gripping and taking out designated one of the cartridges 1. A Y motor 8 moves the hand mechanism 7 in the direction Y. An X motor allows the accessor mechanism 10, i.e., the hand mechanism 7 to freely move between the cells 2 and the drive unit 4. In FIG. 5, the reference numeral 3 designates a honeycomb plate.

Figure 6:
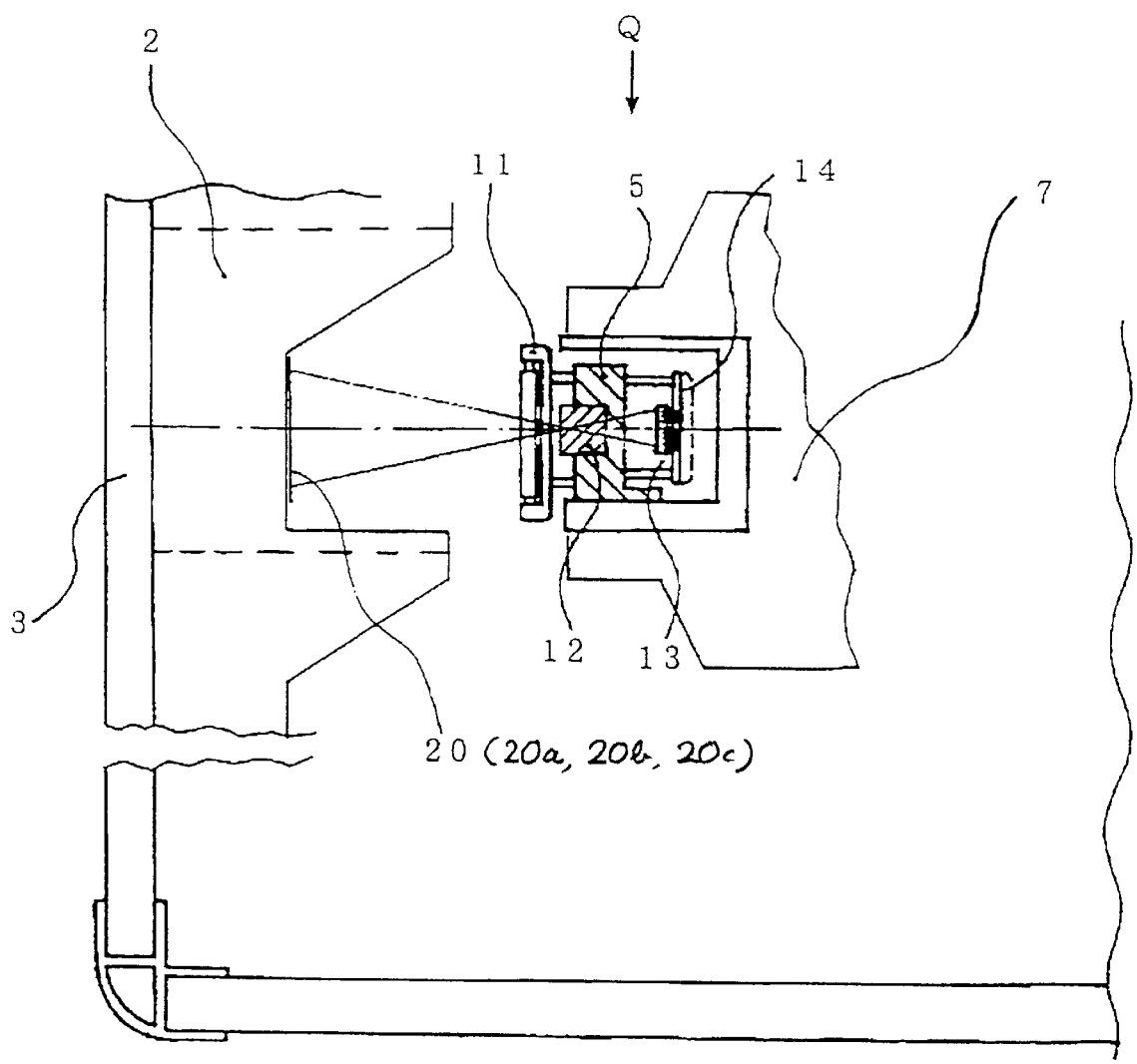
FIG. 6 is a fragmentary enlarged view of a portion indicated by a circle P in FIG. 5.
Figure 7:
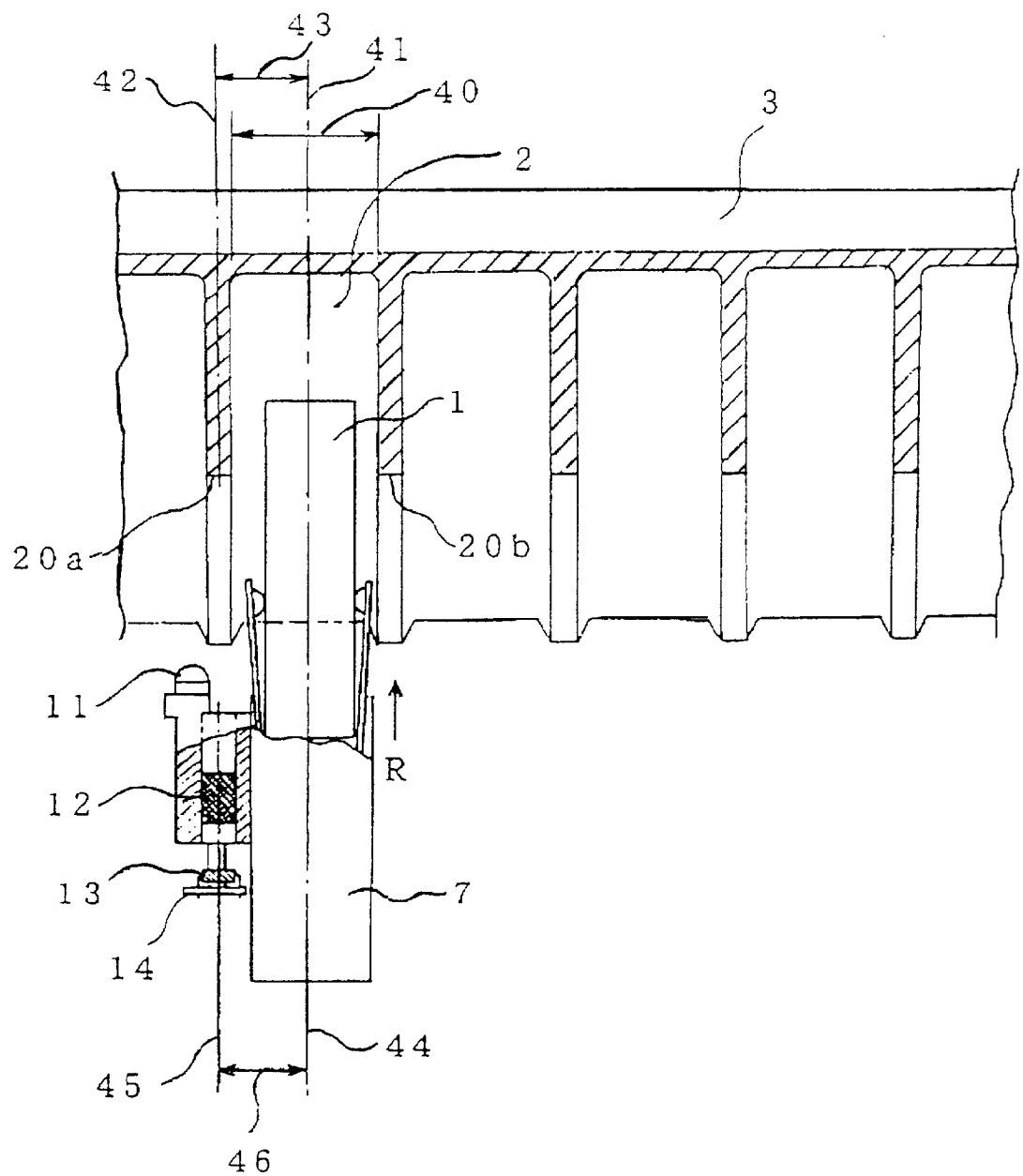
FIG. 7 is a view as seen in a direction indicated by an arrow Q in FIG. 6.
Figure 8:
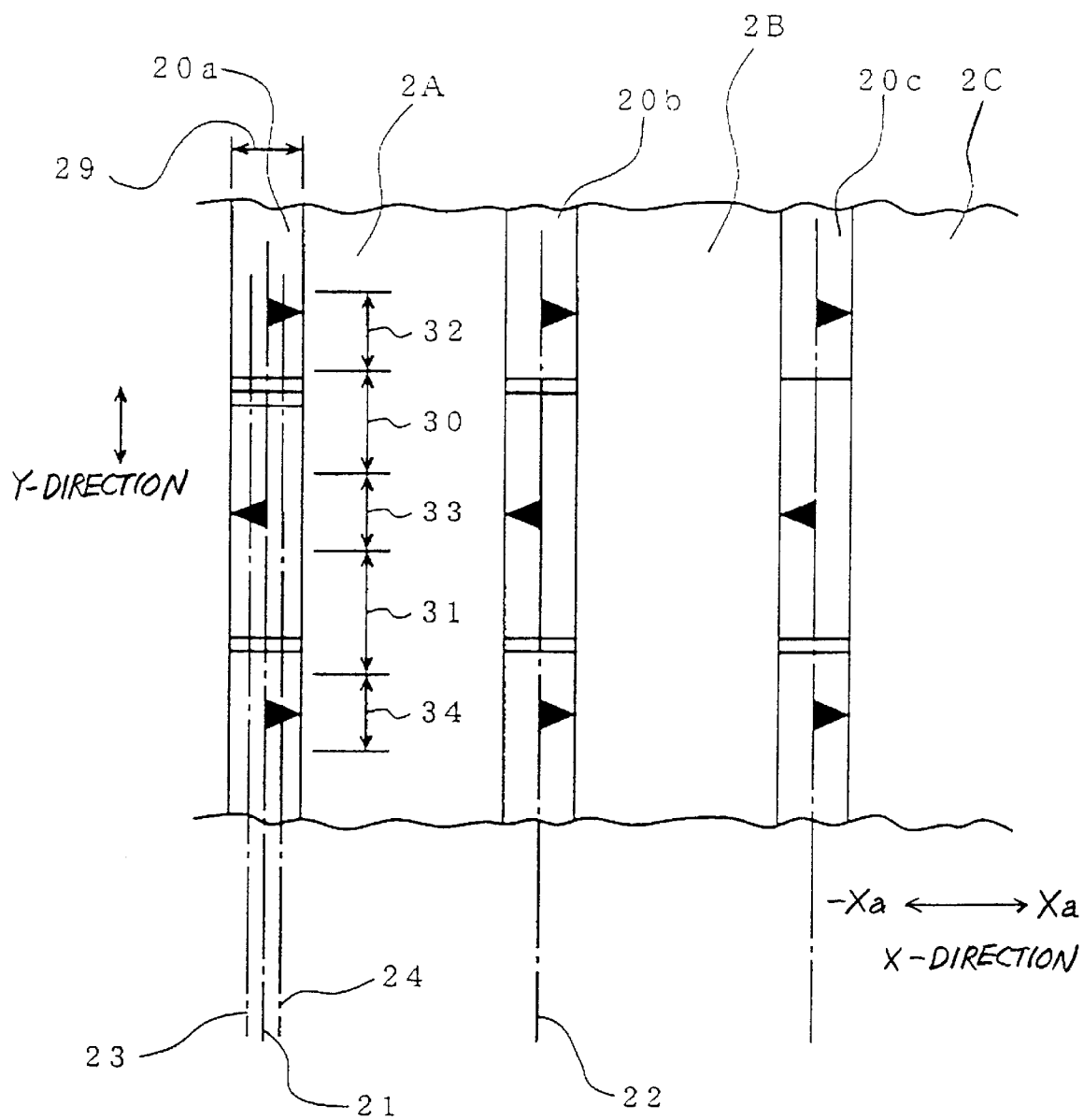
FIG. 8 is a view as seen in a direction indicated by an arrow R in FIG. 7.

As shown in FIG. 6, a positioning mechanism indicated by a circle in FIG. 5 includes a light source 11, a lens 12, a monodimensional CCD 13 and a CCD board 14 mounted on the hand mechanism 7. The CCD board 14 transforms an analog signal output from the CCD 13 to a digital signal. As shown in FIG. 7, each cell 2 has a width 40 having a center axis 41 while an address chart 20a has a center axis 42. The center axis 41 and 42 are spaced by a distance 43. In the hand mechanism 7, a portion for gripping the cartridge 1 has a center axis 44 while the CCD 13 has an optical axis 45 spaced from the center axis 44 by a distance 46. The distances 43 and 46 are equal to each other. As shown in FIG. 8, cells 2A, 2B and 2C, for example, are provided with address charts or positioning indices 20a, 20b and 20c, respectively. There are also shown in FIGS. 6–8 a lens holder 5, an address chart width 29, an X address chart 30, a Y address chart 31, a JU chart 32, a JC chart 33, and a JD chart 34.

How the above apparatus positions the hand mechanism 7 in the X direction will be described with reference to FIGS. 8–12. As shown in FIG. 8, assume that the address chart 20a of the cell 2A, for example, has a center axis 21 while the address chart 20b of the cell 2B adjacent to the cell 2A has a center axis 22. Also, assume that the X address chart 30 and Y address chart 31 are implemented by bar charts respectively representative of the positions of the associated cell in the X direction and Y direction.

As shown in FIGS. 6 and 7, when light issuing from the light source 11 of the hand mechanism 7 is incident to the address chart 20, it is reflected in accordance with the reflectance of a white portion and that of a black portion constituting the address chart 20. The reflected light is incident to the CCD 13 via the lens 12. As a result, the CCD or photoelectric transducer 13 output an electric signal corresponding to the intensity of the incident light.

Figure 9:
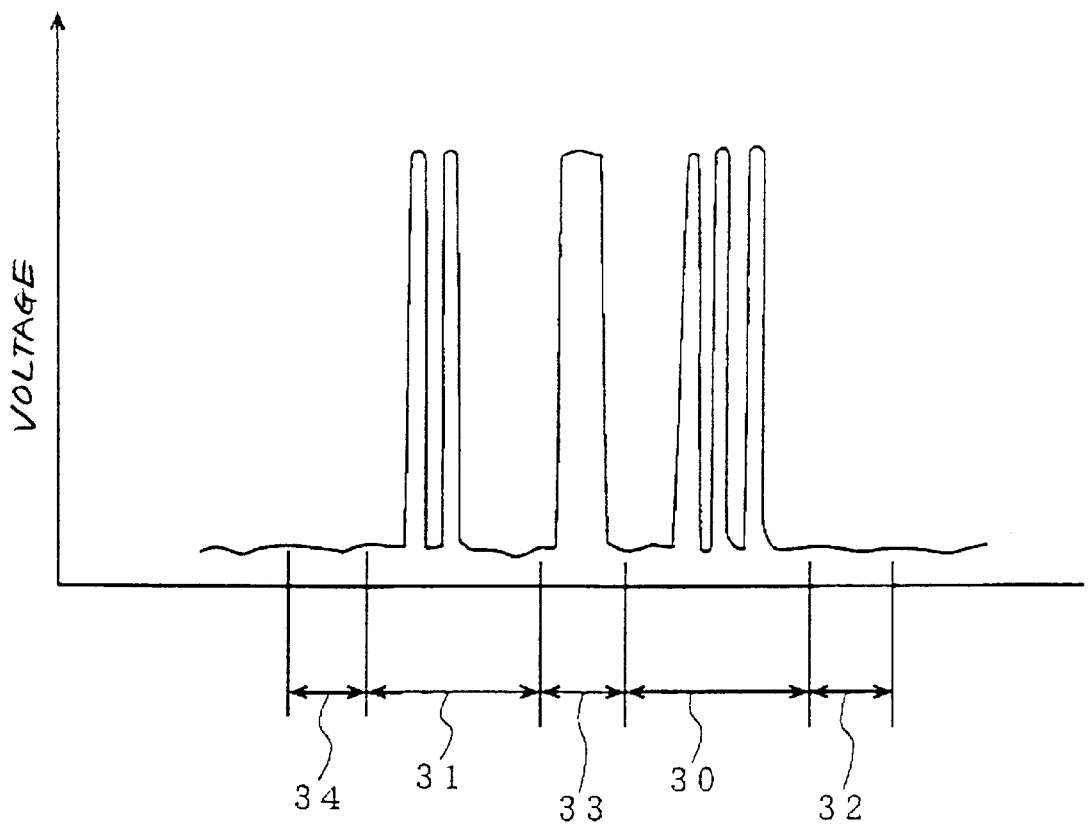
FIG. 9 shows a waveform which a CCD included in the illustrative embodiment outputs on sensing an axis 23 of FIG. 8.
Figure 10:
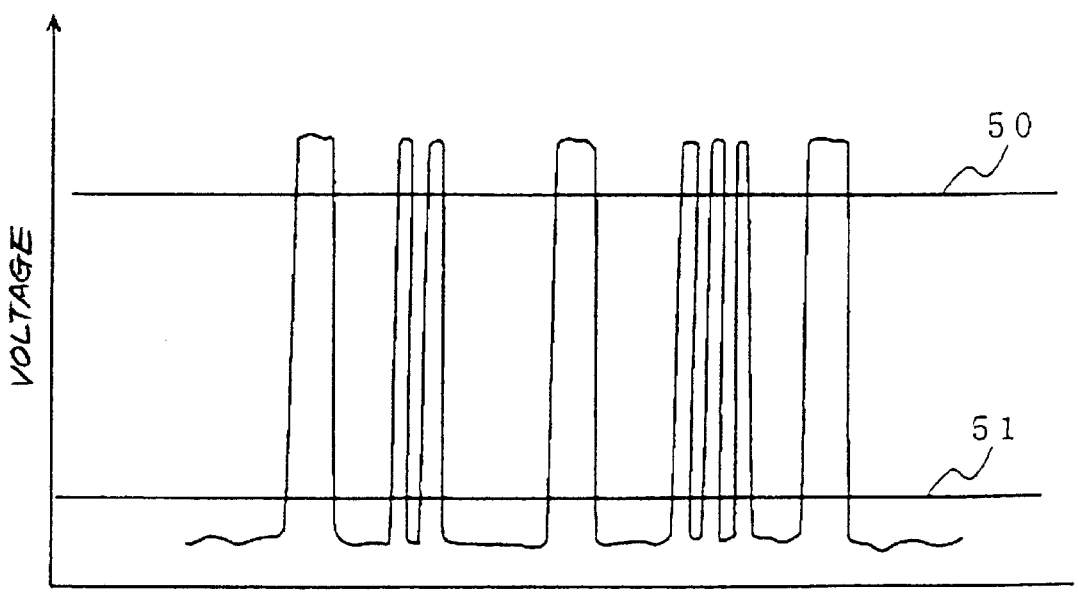
FIG. 10 shows a waveform which the CCD outputs on sensing an axis 21 of FIG. 8.
Figure 11:
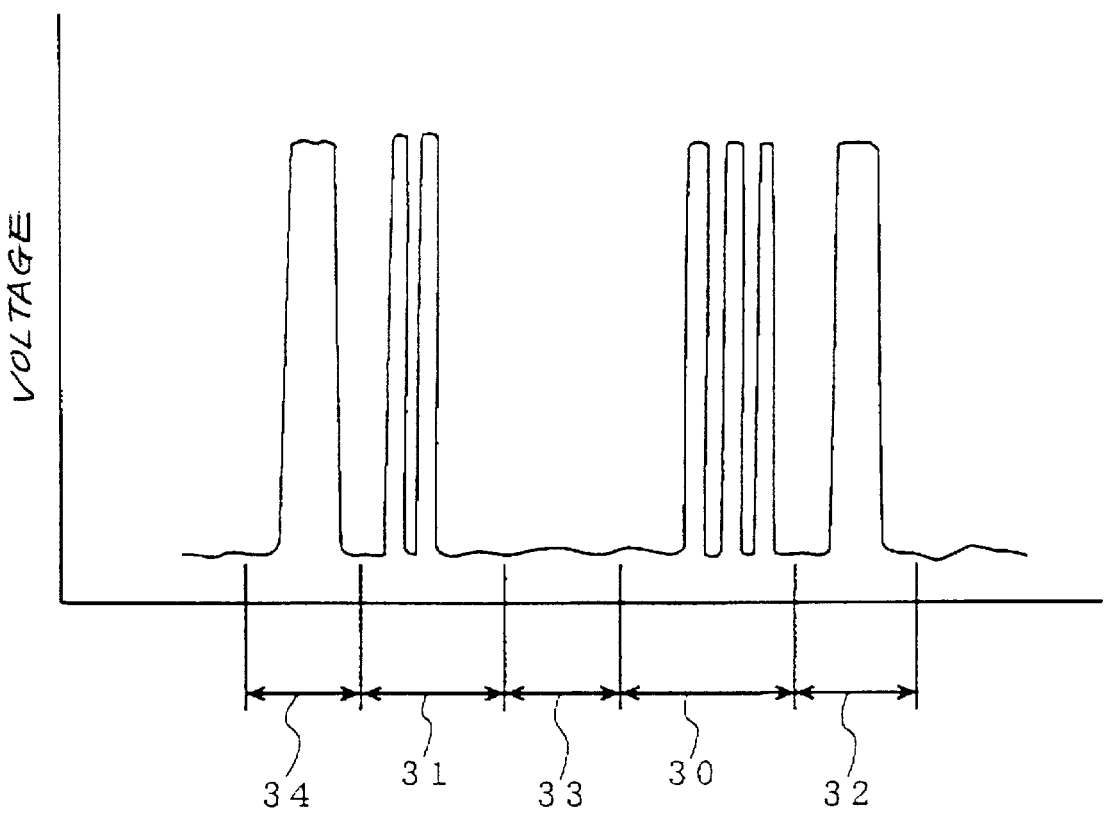
FIG. 11 shows a waveform which the CCD outputs on sensing an axis 24 of FIG. 8.
Figure 12:
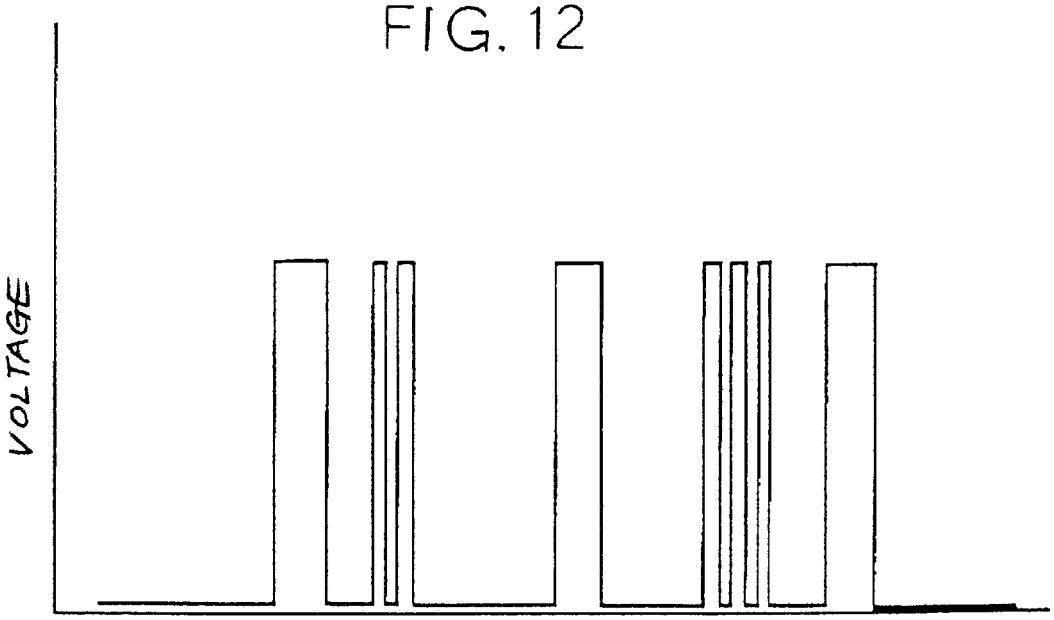
FIG. 12 shows a digital waveform derived from the waveform of FIG. 10.

FIGS. 9–11 respectively show the waveforms of signals which the CCD 13 outputs when its optical axis is positioned at an axis 23, the center axis 21 and an axis 24 defined on the address chart 20a. In FIG. 3, the number of bars forming the X address chart 30 is representative of an X address particular to the cell to which the chart 30 is assigned. Likewise, the number of bars forming the Y address chart 31 is representative of a Y address particular to the above cell.

The JU chart 32, JC chart 33 and JD chart 34 shown in FIG. 8 are representative of a stop position of the cell 2. When the hand mechanism 7 moving in the X direction reaches the axis 23, the output of the CCD 13 has the waveform shown in FIG. 9. As the hand mechanism 7 is further moved in the X direction to the center axis 21, the output of the CCD 13 has the waveform shown in FIG. 10. At this instant, the CCD board 14 digitizes the output of the CCD 13 with an upper threshold voltage H50 and a lower threshold voltage L51, thereby outputting a digital waveform shown in FIG. 12. When the hand mechanism 7 reaches the axis 24, the CCD 13 outputs the signal shown in FIG. 11.

More specifically, as shown in FIG. 9, at the axis 23, the CCD 13 senses three bars of the X address chart 30 representative of an X address assigned to the cell and two bars of the Y address chart 31 representative of a Y address assigned to the same. In addition, the CCD 13 senses no bars at the JU chart 32, senses one bar at the JC chart 33, and senses no bars at the JD chart 34. The optical axis of the CCD 13 is therefore determined to be located between the center axis 21 and the axis 23.

As shown in FIG. 10, at the center axis 21, the X address and Y address of the cell are determined on the basis of the X address chart 30 and Y address chart 31. Also, because the digital waveform shown in FIG. 12 has a single high level at each of its portions corresponding to the JU chart 32, JC chart 33 and JD chart 34, the accessor mechanism 10 is determined to be held in a halt at the center axis 21.

As shown in FIG. 10, at the axis 24, no bars are sensed out of the JC chart 33. The accessor mechanism 10 is therefore determined to be positioned between the center axis 21 and the axis 24.

When the accessor mechanism 10 is positioned at the axis 23 shown in FIG. 8, waveforms representative of the JU chart 32 and JD chart 34 do not appear, as stated above. In this case, the X motor 9 moves the accessor mechanism 10 in a direction Xa also shown in FIG. 8 until the waveform of FIG. 10 appears. When the accessor mechanism 10 is positioned at the axis 24, the X motor 9 moves the mechanism 10 until the waveform of FIG. 10 appears. In this manner, the accessor mechanism 10 can be accurately brought to a stop at the center axis 21.

Figure 13:
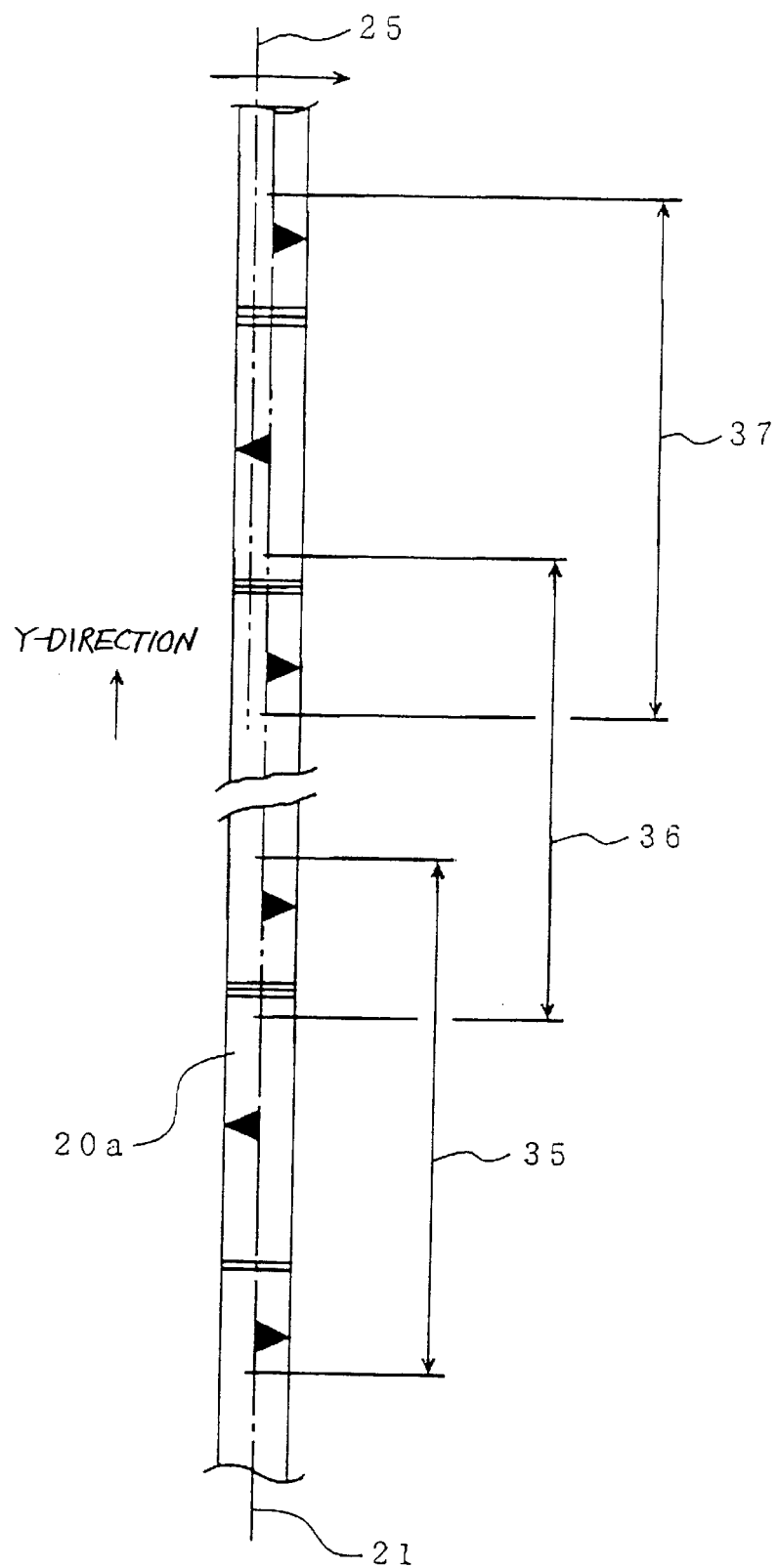
FIG. 13 is a view as seen in a direction indicated by an arrow R in FIG. 7.

Reference will be made to FIGS. 13–17 for describing a procedure for moving only the hand mechanism 7 in the Y direction while holding the accessor mechanism 10 in alignment with the center axis 21, FIG. 8, in the X direction. As shown in FIG. 13, assume that the CCD 13 stopped in alignment with the center axis 21 of the address chart 20a senses a range 35. At this instant, the waveform of FIG. 10 appears. When the Y motor 8 moves the hand mechanism 7, i.e., the CCD optical axis 45 in the Y direction over a range 36, a waveform shown in FIG. 14 appears. As the Y motor 8 further moves the hand mechanism 7 to a range 37 in the Y direction, a waveform shown in FIG. 15 appears. At this instant, the CCD board 14 digitizes the waveform of FIG. 15 with the threshold voltages H50 and L51, outputting a digital waveform shown in FIG. 17.

Figure 14:
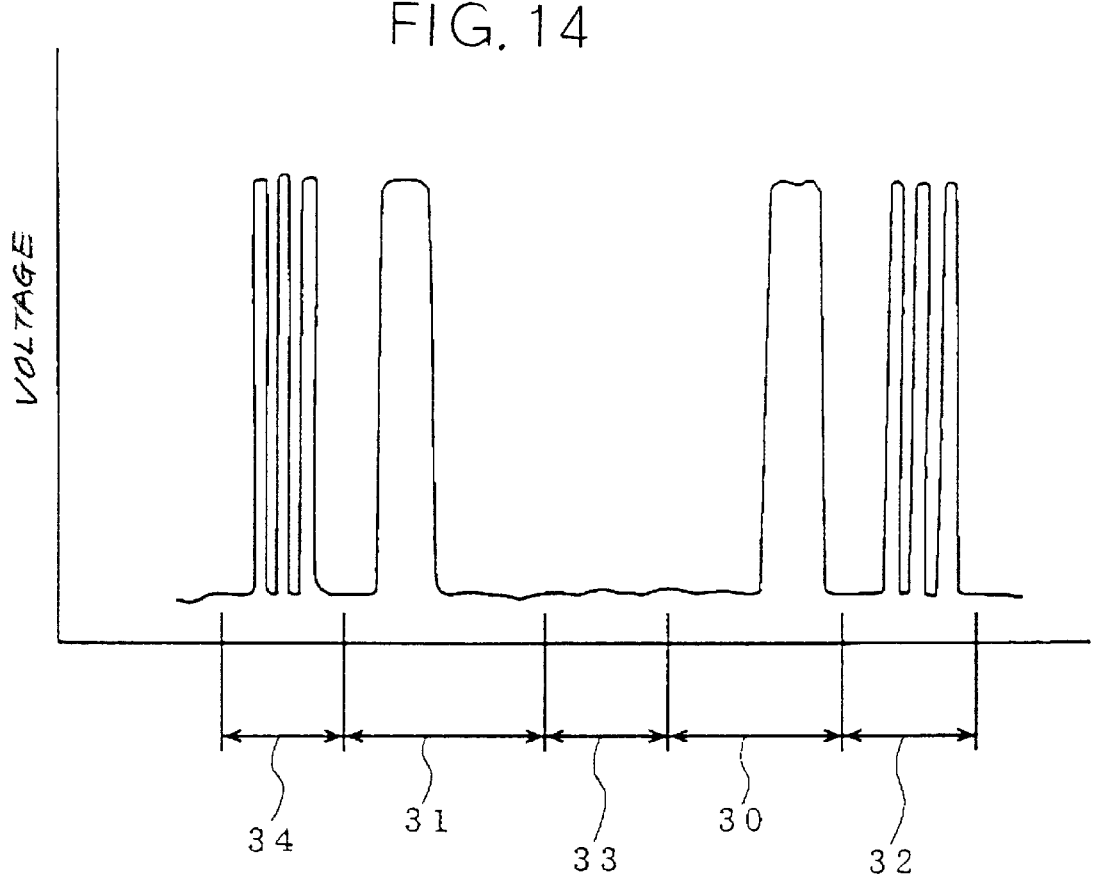
FIG. 14 shows a waveform which the CCD outputs on sensing a range 36 of FIG. 13.
Figure 15:
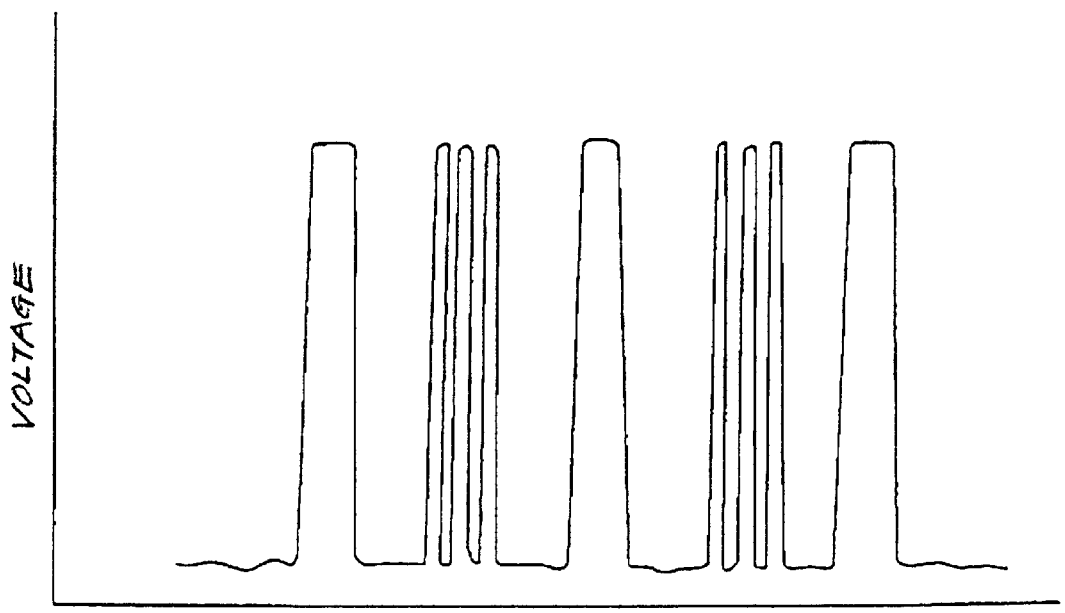
FIG. 15 shows a waveform which the CCD outputs on sensing a range 37 of FIG. 13.

When the CCD 13 senses a portion between nearby cells, e.g., the range 36 of FIG. 13, it outputs the waveform of FIG. 14 having three peaks at each of the JU chart 32 and JD chart 34. This waveform shows that the range being sensed by the CCD 13 is not a regular range. In this case, the Y motor 8 moves the hand mechanism 7 further in the direction Y of FIG. 13.

Figure 16:
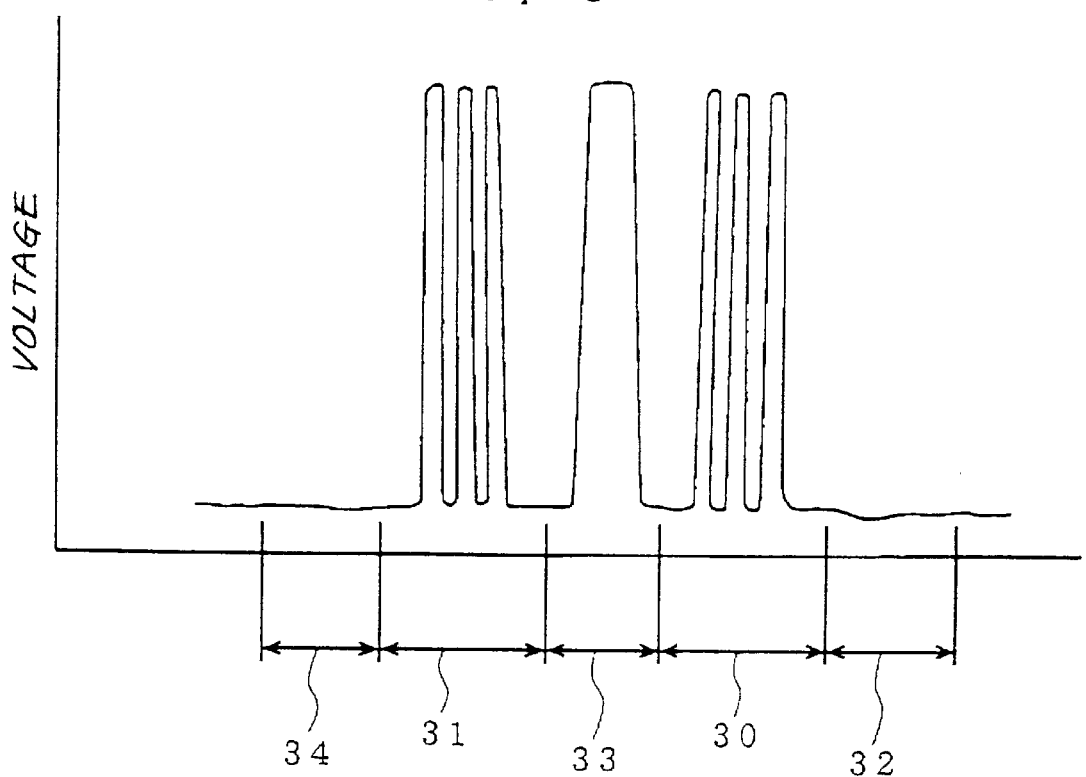
FIG. 16 shows a waveform which the CCD outputs on sensing an axis 25 of FIG. 13.

Assume that the address charts 20a and 20b are not precisely parallel to each other. Then, the CCD optical axis 45 is positioned at an axis 25 shown in FIG. 13, despite that the CCD 13 is located in the range G37. As a result, the CCD 13 outputs a waveform shown in FIG. 16, showing that no charts are sensed at the JU chart 32 and JD chart 34. In this case, the X motor 9 moves the accessor mechanism 10 in a direction Xb shown in FIG. 13 until the waveform of FIG. 15 appears. Therefore, with the CCD 13, it is possible to determine the position of any cell 2 in the X direction and Y direction and to accurately determine the position of the center 44 of the grip portion of the hand mechanism 7.

As stated above, the accessor mechanism 10 is accurately movable from any cell 2 in the X direction and Y direction. This, coupled with the fact that the hand mechanism 7 is accurately brought to a stop at any position in the Y direction, accurately positions the hand mechanism 7 at any desired cell, the drive unit 4 or the opening 6 in the X direction and Y direction.

Figure 17:
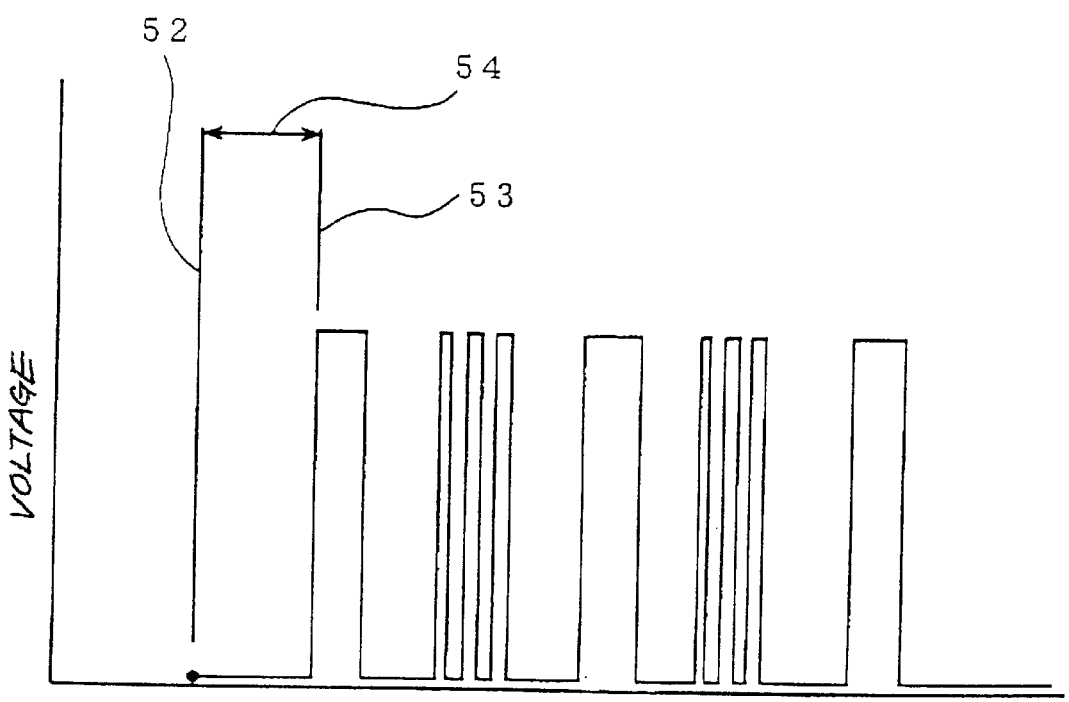
FIG. 17 shows a digital waveform derived from the waveform of FIG. 15.

Nearby cells 2 should only be positioned in the range of the address chart width 29, FIG. 8. Therefore, the fixed tolerance of each cell 2 with respect to the honeycomb plate 3 should only be set in the address chart width 29. As for a position in the Y direction a JU chart distance 54 shown in FIG. 17 is stored in a memory beforehand. This allows a position in the Y direction to be determined by counting a distance from the first CCD bit to the rise 53 of the JU chart with a counter while comparing it with the stored distance. It follows that the cell 2 does not have to be accurately positioned in the Y direction either.

The illustrative embodiment therefore noticeably eases accuracy requirements as to the contour and position of the individual cell, holes formed in the honycomb plate for mounting the cells, and taps, realizing an inexpensive cell fixing method. In addition, the position sensor is small size and accurate and occupies a minimum of space available in the hand mechanism 7, promoting the free layout of the apparatus.

In the illustrative embodiment, the address charts each are implemented by a black-and-white pattern printed on a molded cell by silk printing. Alternatively, use may be made of a sheet, or seal, of paper or resin and adhered to a preselected position of a cell by a two-sided adhesive tape. If desired, black and white may be replaced with a color whose reflectance is above 80% and a color whose reflectance is below 15%. Further, a color combination implementing a difference in reflectance between a high reflectance portion and a low reflectance portion of 70% may be used.

In summary, it will be seen that the present invention provides a magnetic tape apparatus capable of determining the X address and Y address of a cell at the same time and accurately positioning the center of a cell. Further, the apparatus miniaturizes addresses indicative of the positions of cells and obviates the conventional numerous plates extending over respective cases and can therefore be freely laid out. Even when the individual cell is slightly dislocated, the apparatus identifies a position cell by cell and therefore eases accurately requirements as to the contour and position of the individual cell, holes formed in honeycomb plate, and taps. The apparatus therefore has a simple, low cost structure.

Various modifications will become possible for those skilled in the art after receiving the teachings of the present disclosure without departing from the scope thereof.

What is claimed is:

1. A magnetic tape apparatus comprising:

an accessor mechanism movable in a Y direction;

a hand mechanism mounted on said accessor mechanism and movable in an X direction perpendicular to the Y direction;

at least one cell receiving a cartridge from said accessor mechanism and accommodating the cartridge, the cartridge storing a recording medium therein;

an address chart on said at least one cell, said address chart serving as an index, indicative of a position of said at least one cell in the X direction and the Y direction; and reduction optics on said hand mechanisms comprising a light source, a monodimensional CCD (Charge Coupled Device) and a lens, said reduction optics aligning said hand mechanism with a center axis of said at least one cell using said address chart.

2. The apparatus as claimed in claim 1, wherein said address chart is printed in a first color having a reflectance of above 85% and a second color having a reflectance of below 15%.

3. The apparatus as claimed in claim 2, wherein said first color is white and said second color is black.

4. The apparatus as claimed in claim 3, wherein said address chart is printed on said at least one cell by silk printing.

5. The apparatus as claimed in claim 3, wherein said address chart comprises a printed seal adhered to said at least one cell.

6. The apparatus as claimed in claim 2, wherein said address chart is printed on said at least one cell by silk printing.

7. The apparatus as claimed in claim 2, wherein said address chart comprises a printed seal adhered to said at least one cell.

8. The apparatus as claimed in claim 1, wherein said address chart comprises an address chart having a color combination with a minimum difference in reflectance between a high reflectance portion and a low reflectance portion of 70%.

9. The apparatus as claimed in claim 8, wherein said address chart is printed on said at least one cell by silk printing.

10. The apparatus as claimed in claim 8, wherein said address chart comprises a printed seal adhered to said at least one cell.

11. The apparatus as claimed in claim 1, wherein said address chart is printed on said at least one cell by silk printing.

* * * * *